UNITED STATES PATENT OFFICE.

L. B. SWAN, OF ROCHESTER, NEW YORK.

IMPROVEMENT IN GALVANIC BATTERIES FOR TELEGRAPHS.

Specification forming part of Letters Patent No. 5,400, dated December 18, 1847.

*To all whom it may concern:*

Be it known that I, LANSING B. SWAN, of the city of Rochester, in the county of Monroe and State of New York, have invented a new and useful improvement in the manner of exciting the galvanic battery used for the conveyance of intelligence by means of the electro-magnetic telegraph; and I do hereby declare that the following is a full and exact description thereof.

The battery that I use does not differ from such as are now well known and employed for the exciting of galvanic action, the zinc plates or cylinders of which are amalgamated or coated with mercury. My improvement consists in the employment of an exciting-fluid which acts so slightly on the mercury with which the zinc plates or cylinders are amalgamated as to prevent the necessity of its frequent renewal. It has been heretofore found necessary to repeat this process when the battery is kept in constant action, as at the telegraph-stations, every day or two, and the neglect of it has been attended by great loss and inconvenience, as is well known to those who are conversant with the subject.

The fluid that I employ consists of a solution of sulphuric acid and water, which is to be kept saturated with an alkaline sulphate; and it has been found that by the employment of this fluid as an excitant the battery may be kept in continued action for several weeks without its being necessary to repeat the amalgamating process.

In preparing my solution I take one part of sulphuric acid and twelve parts (more or less) of water, and I saturate the same with sulphate of soda, or with other soluble sulphate having an alkaline base, taking care to keep up the saturation by supplying the generating-cells with an excess of the crystal of the sulphate employed, and this, as has been fully proved by repeated and long-continued experiment, will have the effect of rendering the decomposition of the mercurial amalgam so slow as to insure the result hereinbefore stated.

I am fully aware that not only diluted sulphuric acid, but that all the soluble sulphates have been used in the cells of the galvanic battery, and that some of these sulphates have also been used in combination with various diluted acids; but I do not know or believe that it has been heretofore discovered that the solution as prepared by me, and which consists of dilute sulphuric acid kept saturated with an alkaline sulphate, would have the effect of protecting the amalgamated surface of the zinc, and consequently of the zinc itself, from the excessive action of the sulphuric acid for a period of several weeks; nor do I believe that the solution of sulphuric acid so kept saturated has ever been used for such purpose.

What I claim, therefore, as new, and desire to secure by Letters Patent, is—

The use of the within-named solution when applied to the batteries of the electro-magnetic telegraph, said solution consisting of dilute sulphuric acid kept saturated by an alkaline sulphate, for the purpose and in the manner herein fully made known.

In the foregoing specification and claim I have, as it will be seen, limited my claim to the use of my solution in batteries used for telegraphic purposes, and this I have done that I may not be supposed in any way to interfere with experiments having for their object the advancement of science.

LANSING B. SWAN.

Witnesses:
A. S. LANE,
I. L. SWAN.